(12) United States Patent
Paragios et al.

(10) Patent No.: US 7,079,674 B2
(45) Date of Patent: Jul. 18, 2006

(54) VARIATIONAL APPROACH FOR THE SEGMENTATION OF THE LEFT VENTRICLE IN MR CARDIAC IMAGES

(75) Inventors: Nikolaos Paragios, Plainsboro, NJ (US); Visvanathan Ramesh, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 624 days.

(21) Appl. No.: 10/150,613

(22) Filed: May 17, 2002

(65) Prior Publication Data

US 2003/0053667 A1    Mar. 20, 2003

Related U.S. Application Data

(60) Provisional application No. 60/292,445, filed on May 17, 2001.

(51) Int. Cl.
*G06K 9/00* (2006.01)
(52) U.S. Cl. ..................................................... 382/128
(58) Field of Classification Search ................. 382/128; 600/324, 450, 479, 481
See application file for complete search history.

(56) References Cited

U.S. PATENT DOCUMENTS 6,047,206 A * 4/2000 Albrecht et al. ............ 600/509
6,106,466 A * 8/2000 Sheehan et al. ............ 600/443
6,301,496 B1 * 10/2001 Reisfeld ...................... 600/407
2003/0142868 A1 * 7/2003 Tannenbaum et al. ...... 382/199

OTHER PUBLICATIONS

Jachin Weickert, Bart M ter Haar Romeny, "Efficent and Reliable Scheme for Nonlinear Diffusion Filtering", 1998, IEEE, Transaction on image processing, vol. 7, No. 3 pp. 398-410.*
Amit Chakroborty, Lawrence H Staib, James S. Duncan, "Deformable Boundary Finding in Medical Images byIntergrating Gradient and Region Information", 1996, IEEE, Transactions on Medical imaging, vol. 15, No. 6, pp. 859-870.*

* cited by examiner

Primary Examiner—Daniel Miriam
Assistant Examiner—Oneal Mistry
(74) Attorney, Agent, or Firm—Donald E. Paschburg; F. Chau & Associates

(57) ABSTRACT

A system and method for segmenting cardiac images and, in particular, segmenting the left ventricle of the heart using a contour propagation model that integrates visual information and anatomical constraints. The visual information comprises a gradient vector flow-based boundary component and a region component that separates the cardiac contours/regions according to their global intensity properties that reflect the different tissue properties. The anatomical constraints couple the propagation of cardiac contours according to their relative distance. The propagation model comprises a weighted integration of a boundary segmentation model, a region model and coupling function.

24 Claims, 6 Drawing Sheets

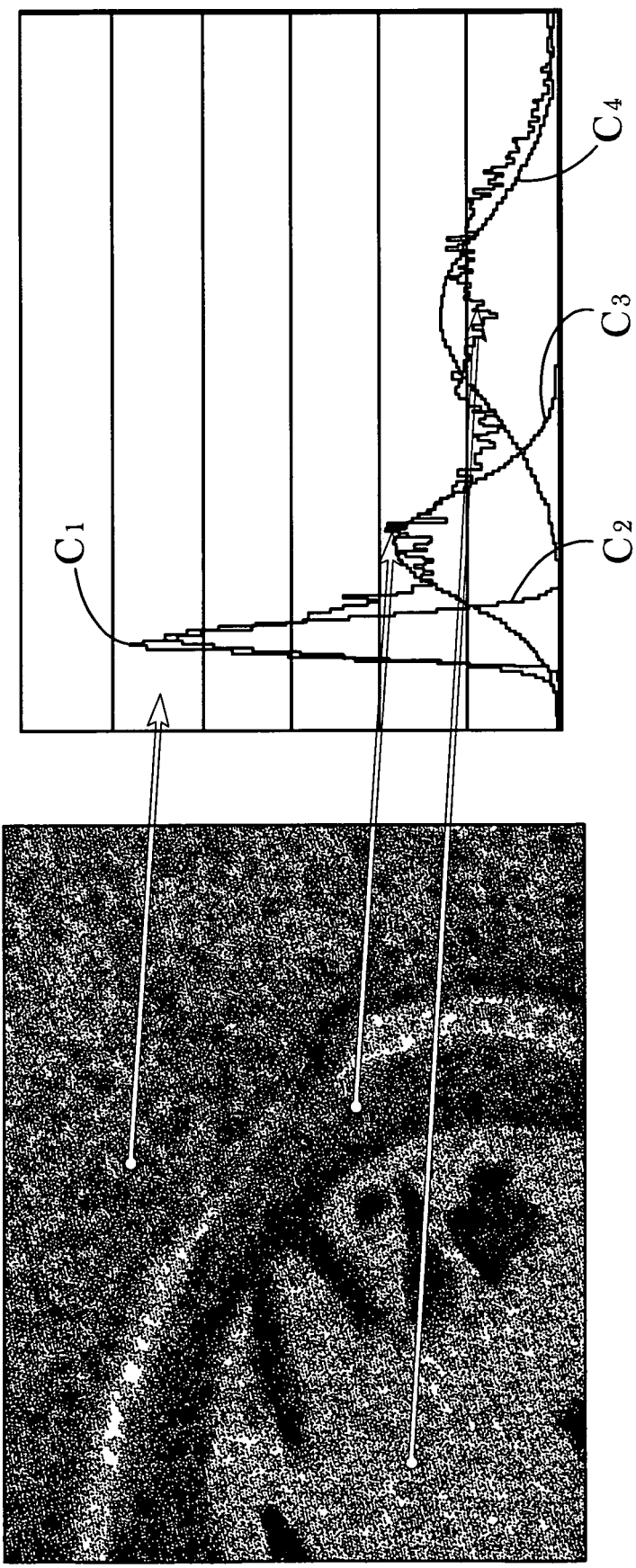

VARIATIONAL APPROACH FOR THE SEGMENTATION OF THE LEFT VENTRICLE IN MR CARDIAC IMAGES

CROSS-REFERENCE TO RELATED APPLICATION

This application claims priority to U.S. Provisional Patent Application Ser. No. 60/292,445, filed on May 17, 2001.

TECHNICAL FIELD

The present invention is generally directed to a system and method for segmenting cardiac images. In particular, the invention is directed to a system and method for segmenting the left ventricle of the heart using a contour propagation model that integrates visual information and anatomical constraints. The visual information comprises a gradient vector flow-based boundary component, and a region component that separates the cardiac contours/regions according to their global intensity properties that reflect the different tissue properties. The anatomical constraints couple the propagation of cardiac contours according to their relative distance.

BACKGROUND

Medical Image Processing is a growing application domain. Magnetic Resonance Imaging (MRI) may be used to provide a time-varying three dimensional image of the heart that can be used for diagnostic purposes. The cardiac images can be processed using general purpose computer vision techniques. However, these techniques fail to take fully advantage of the available prior knowledge from other domains such as physiology, cardiology, etc.

Cardiac segmentation is a well explored topic in Medical Image Analysis due to the fact that the outcome can have strong diagnostic power. Accuracy and precision are two important requirements in the segmentation of medical structures and, consequently, various boundary-driven methods have been developed for segmentation. These methods are based on the generation of a boundary image and the extraction of a continuous structure that accurately accounts for the boundary information.

For example, the well-known "snake" model is a pioneering framework that is the basis of significant boundary-driven image segmentation techniques (see, e.g., Kass, et al., "Snakes: Active Contour Models", *International Journal of Computer Vision*, 1, pp. 321–332, 1988). Briefly, the snake model refers to an energy minimization technique that seeks the lowest potential of a curve-based objective function. This function is a compromise between a boundary image-driven attraction term and a term that accounts for the desired internal properties of the curve. According to the original snake model, the structure to be recovered refers to a set of points in the 2-D or 3-D space that is deformed locally towards the desired image characteristics while being constrained to respect some internal properties. Although this primitive approach has led to outstanding results, it can be sensitive to noisy or physically corrupted data.

Deformable templates and parameterized snakes such as B-splines and active shapes have been proposed on top of the original snake framework to overcome its poor performance on noisy data. Thus, prior to the segmentation process, a shape model is built using a certain number of training examples. This model refers to few parameters and can express a fairly large set of global and local deformations. The use of these methods can improve the segmentation performance under the condition that the general model can describe a fairly large portion of the eligible segmentation solutions. However, these models are quite sensitive to the initial conditions.

"Myopic" is a term often used to describe the dependency of the snake model from the initial conditions. The snake model is based on very local information and therefore the initial conditions have to be close enough from the optimal solution. Balloon forces have been proposed to liberate this model from the initial conditions. The central idea is to introduce a constant force that tends to continuously expand or shrink the initial structure. Clearly, this component can have a beneficial contribution to the original model under the condition that the initial structure either encircles the area to be recovered or is completely surrounded by the region to be segmented. This condition, however, cannot be easily met for general medical image segmentation applications.

In order to overcome these constraints, the use of regional/global information has been also considered and widely explored. The evolving contour is used to define an image partition that consists of two regions. The inner region refers to the area to be recovered and outer one to the rest of the image (background). Then, the global homogeneity regional properties are used to discriminate the region of interest from the background. These properties can be modeled using continuous probability density functions that are dynamically updated according to the latest segmentation map.

The evolution of boundary-based medical image segmentation techniques have led to a set of modules that deform an initial structure (set of points) towards the desired image characteristics. Based on these considerations, it is clear that the segmentation result will inevitably depend on the parameterization of the initial structure (position, number of the control points, etc.) Moreover, the technique that is used to re-parameterize the evolving structure will also hold a significant role in the segmentation process. Although various techniques have been proposed to deal with these issues, this dependency is not natural for an image segmentation approach.

Level Set Representations have been proposed as an alternative (to the Lagrangian) technique for evolving interfaces. These representations are a common choice for the implementation of variational frameworks in Computer Vision. The evolving contour is represented using a continuous zero-level set function of a higher dimension. Such representations can be implicit, intrinsic, parameter and topology free. The use of level set methods to evolve interfaces has led to an expansion of boundary-driven methods for image segmentation.

As is known in the art, the geodesic active contour refers to an optimization framework that was introduced as a geometric alternative to the original snake model. The main strength of this model is its implicit parameterization that can lead to a natural handling (through level sets) of topological changes (merging/splitting).

A step further, was the combination of boundary-driven flows with global regional intensity information and their implementation using the level set representations. The segmentation procedure then becomes quite independent from the initial conditions. Topological changes can be handled through the level set representations while arbitrary initial conditions can be dealt with by using global regional information. Such approaches are of great interest in medical image processing where structures are very complicated and consist of multiple components. However, they still suffer from robustness when noisy and incomplete data is to be dealt with. In addition, they fail to take advantage of the prior shape knowledge that is available from physiology regarding the medical structures to be segmented.

Some efforts have been made to address this limitation. For example, prior shape knowledge has been introduced to the geodesic active contour model. In another method, a shape influence term is combined with boundary and region-driven visual information to further increase the robustness of level set-based methods to noisy and incomplete data. One can claim that this objective can be met with the use of snakes and deformable templates.

Many medical applications involve the simultaneous extraction of multiple structures that are positioned in a constrained way (physiology) in the image plane. These high level (abstract) constraints can be transformed to low level segmentation modules according to the relative positions of the structures of interest. For example, one method for cortex segmentation considers a constrained (coupled) propagation of two contours according to some physical properties of the brain.

As noted above, Magnetic Resonance Imaging (MRI) provides time-varying three-dimensional imagery of the heart. To help in the diagnosis of disease, physicians are interested in identifying the heart chambers, the endocardium and the epicardium. Moreover measuring the ventricular blood volume, the ventricular wall mass, the ventricular wall motion and wall thickening properties over various stages of the cardiac cycle is a challenging task. The left ventricle is of particular interest because it pumps oxygenated blood from the heart to distant tissue in the entire body.

There have been methods proposed for cardiac segmentation. For example, Argus is a cardiac MR analysis package commercialized by Siemens with the MRease workstation attached to the magnetic resonance "MAGNETOM" systems. The system can perform the segmentation of 3D/4D data sets (volume slices varying in time) automatically. The segmentation algorithm comprises three different modules and is described in the reference by M. Jolly, "Combining Edge Region and Shape Information to Segment the Left Ventricle in Cardiac MR Images", *IEEE International Conference in Computer Vision,* Vancouver, Canada, 2001. The automatic localization module is able to approximately locate the myocardium in a new image based on maximum discrimination. The system learned the gray level aspect of a heart (modeled as a Markov chain) by maximizing the Kullbach distance between the distributions of positive and negative examples of hearts. The local deformation process starts from an approximate contour and deforms it using Dijktra's shortest path algorithm. Multiple iterations of the algorithm are applied in a search space of increasing size around the proximate contour, therefore strengthening good edges and weakening faint edges. A graph cut algorithm is then used to finally choose the best edge pieces that are part of the endocardium. The epicardium is obtained by fitting a spline curve to the edge points outlined by Dijsktra's algorithm. Finally, the propagation module is responsible for providing an approximate starting point to the local deformations.

SUMMARY OF THE INVENTION

The present invention is directed to a system and method for segmenting cardiac images, and in particular, the left ventricle of the heart. Preferably, a level set method is used to segment MR cardiac images, which is based on a coupled propagation of two cardiac contours. A preferred segmentation method integrates visual information and anatomical constraints. Preferably, the visual information is expressed through (i) a gradient vector flow-based boundary component and (ii) a region term that separates the cardiac contours/regions according to their global intensity properties that reflect the different tissue properties. An anatomical constraint is employed to couple the propagation of the cardiac contours according to their relative distance. The resulting motion equations are preferably implemented using a level set approach according to a fast and stable numerical approximation scheme, preferably the Additive Operator Splitting.

In one aspect of the invention, a method for segmenting a cardiac image comprises receiving a cardiac image, determining boundary information for one or more contours in the cardiac image using a gradient vector flow boundary method and determining region information to separate regions in the cardiac image according to their global intensity parameters. A propagation model is applied that combines the boundary and region information to propagate each contour to a target boundary in the cardiac image while applying an anatomical constraint to couple the propagation of the contours according to their relative distance.

In another aspect of the invention, the target boundaries comprise the endocardium and epicardium of the left ventricle of the heart.

In yet another aspect of the invention, a boundary component of the propagation model is preferably based on an extension of the geodesic active contour model using the gradient vector flow.

In another aspect of the invention, the propagation model comprises a weighted integration of a boundary segmentation model, a region model and coupling function.

In a further aspect of the invention, an anatomical constraint comprises an active coupling function that preserves a certain topology for the evolving contours.

These and other aspects, features and advantages of the present invention will be described or become apparent from the following detailed description of preferred embodiments, which is to be read in connection with the accompanying drawings.

BRIEF DESCRIPTION OF THE DRAWINGS

FIGS. 1a and 1b are exemplary diagrams of a cardiac image of the heart, wherein FIG. 1a is an exemplary cardiac image depicting a portion of the left ventricle, and wherein FIG. 1b illustrates the contours of interest of the left ventricle.

FIGS. 3a, b and c are exemplary diagrams illustrating a boundary segmentation method according to the invention, wherein FIG. 3a is an exemplary cardiac image depicting the left ventricle.

FIG. 4 is an exemplary diagram illustrating a method for region segmentation based on probability densities.

DETAILED DESCRIPTION OF PREFERRED EMBODIMENTS

The present invention is generally directed to cardiac segmentation for MR imagery. An objective is to recover the left ventricle and, in particular, the myocardium that is the area between the epicardium (i.e., the inner most layer of the pericardium (sac that surround heart) and the endocardium (the thin endothelial membrane lining the cavities of the heart.) The context of a segmentation application according to the invention is shown in FIG. 1.

Figure 1B:
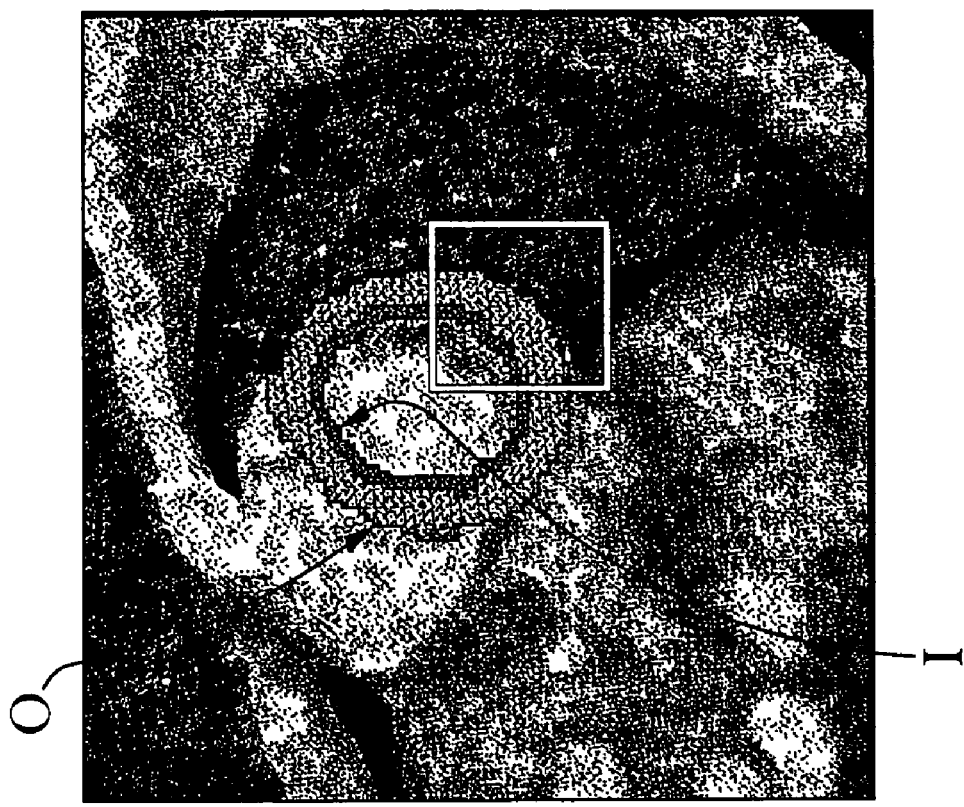
Figure 1A:

FIG. 1a is an exemplary 2-d image of the heart, and in particular, a 2-d slice of the heart showing a cross-section of the left ventricle. The dark ring in FIG. 1 depicts the myocardium (muscle) that constitutes the wall of the left ventricle. In accordance with a preferred embodiment of the present invention, a segmentation method is based on two evolving interfaces as shown in FIG. 1b, the endocardium [$\partial R_I$—inner contour] or inner wall (denoted I) of the myocardium and the epicardium [$\partial R_O$—outer contour] or the outer wall (denoted "O") of the myocardium, as a three-modal image segmentation application: (i) endocardium $R_I$, (ii) myocardium $R_O$-$R_I$, and (iii) background I-$R_O$. We recall that $R_O$ is the epicardium region also includes the endocardium region.

Although the quality of MR imagery is superior to other medical modalities (CT, Ultrasound, etc.), the visual information related with the considered application can be misleading, physically corrupted and some times incomplete. Therefore, it can lead to non-optimal results if processed without taking into account specific application constraints. This is due to the following reasons. One is the presence of papillary muscles in the endocardium. As clearly shown in FIG. 1, although the papillary muscles are part of the endocardium, they refer to different visual properties. As a result, both boundary (due to strong edges) as well as region (due to intensity inconsistencies) driven segmentation modules will fail to recover the muscles as part of the endocardium.

The intensity characteristics of the right ventricle are different from the intensity characteristics of the myocardium and, therefore, the common boundaries can be easily detected. However, the separation of the myocardium from the non-heart components is not always feasible (according to the visual information). Opposite to the papillary muscles case, here there are no boundaries between some cardiac entities and the epicardium. Therefore, boundary as well global intensity-driven modules may fail to provide the appropriate segmentation map.

In accordance with a preferred embodiment of the invention, to deal with the above limitations and the physically corrupted visual information, the following assumptions are made: (1) both cardiac contours, the endocardium and the epicardium are smooth; (2) the intensity properties of the epicardium (with the exception of papillary muscles) and the myocardium are quite different and strong discontinuities (high gradient) are present along their boundaries; and (3) the distance in the normal direction (geodesic path) between the inner (I) and the outer (O) contour is relatively constant, as shown in FIG. 1b.

In general, a system and method according to the present invention comprises a three-modal segmentation framework that determines the propagation of two contours, the endocardium contour and the epicardium contour. In the exemplary application, the region of interest (ROI) comprises the area between the endocardium and epicardium contours, i.e., the myocardium (as shown in FIG. 1b).

A segmentation process according to a preferred embodiment of the invention is based on a geometric flow that integrates visual information with anatomical constraints. The visual information is preferably expressed through (i) a boundary-driven component and (ii) a global region-based segmentation module. In contrast to conventional segmentation methods, a segmentation process according to the invention preferably employs bi-directional flow that is free from the initial conditions and can capture the object boundaries from either side. The region component comprises a grouping module that preferably separates the intensity characteristics between the epicardium, the endocardium and the background. These characteristics are globally estimated through an EM algorithm and dynamically updated.

Preferably, anatomical constraints are employed to address parts of the region of interest with misleading visual information. In particular, based on a priori knowledge of the anatomy of the heart, the relative positions of the epicardium and endocardium contours are constrained using a coupling model. The resulting motion equations are preferably implemented using a level set representation using a fast and stable numerical technique, the Additive Operator Splitting. Excellent experimental results validate the advantages and accuracy of a segmentation process according to the invention.

It is to be understood that the system and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD ROM, ROM, etc.), and executable by any device or machine comprising suitable architecture. It is to be further understood that since the constituent system modules and method steps depicted in the accompanying Figures are preferably implemented in software, the actual connections between the system components (or the flow of the process steps) may differ depending upon the manner in which the present invention is programmed. Given the teachings herein, one of ordinary skill in the related art will be able to contemplate these and similar implementations or configurations of the present invention.

Figure 2:
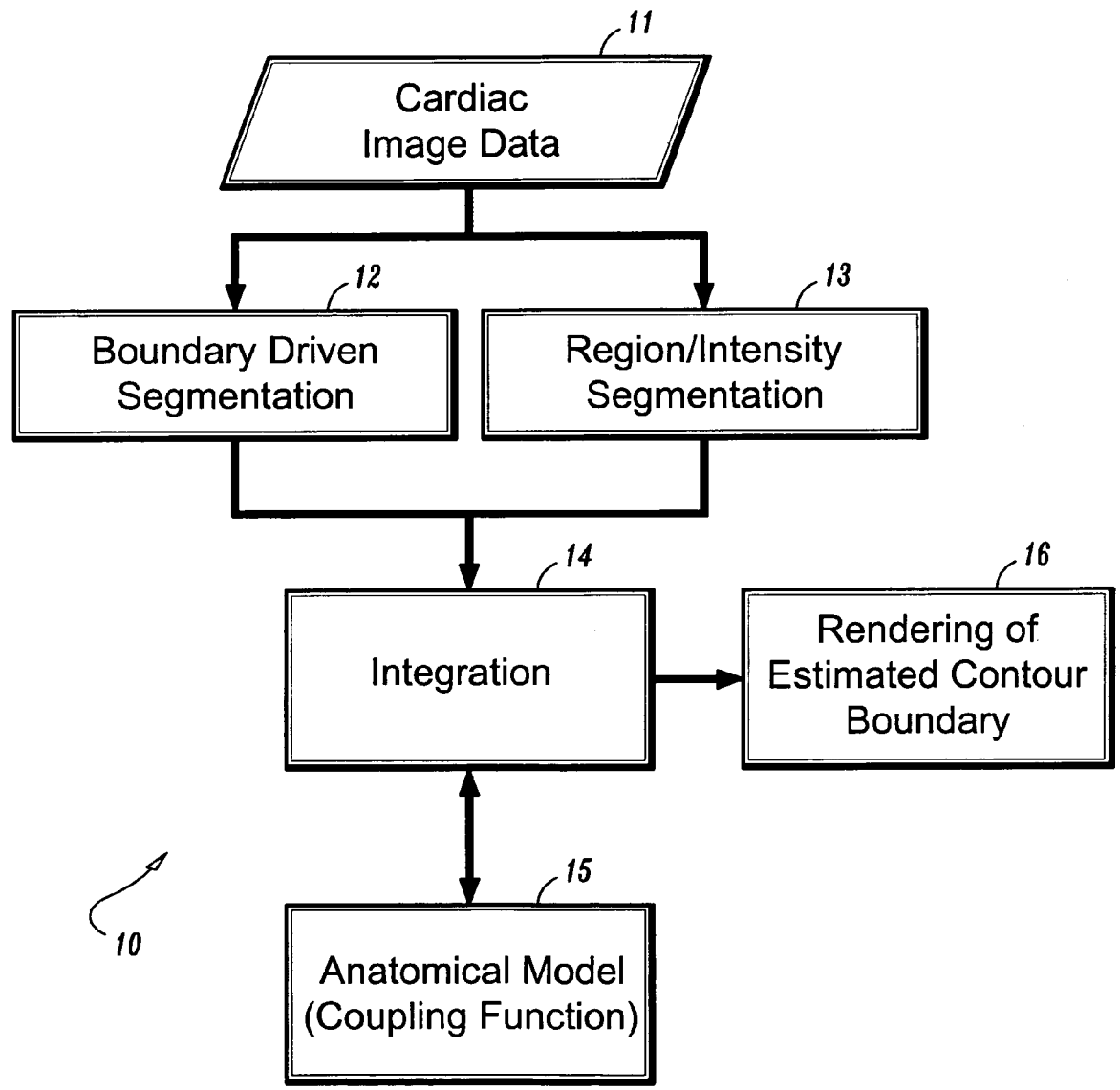
FIG. 2 is a block diagram of a system for segmenting a cardiac image according to an embodiment of the invention.

FIG. 2 is a block diagram of a system 10 for segmenting cardiac images according to an embodiment of the present invention. It is to be understood that notwithstanding that preferred embodiments described herein are directed to segmenting the left ventricle of the heart, the principles of the present invention may be implemented with image segmentation methods associated with other anatomical components.

The system 10 processes cardiac image data 11 that is preferably captured using MRI methods. The visual information that is captured using MRI is of high quality and very accurate in MR sequences. The system 10 comprises a multi-modal segmentation framework that is based on the propagation of two contours, the endocardium contour and the epicardium contour. The cardiac image data 11 is processed by a boundary-driven segmentation module 12 and a region/intensity segmentation module 13.

In a preferred embodiment, the boundary-driven segmentation module 11 implements a boundary model that is an extension of the well-known geodesic active contour model, which determines a minimal length geodesic curve that best takes into account the desired image characteristics. A key limitation of the conventional geodesic active contour model is its strong dependency from the initial conditions. In accordance with the present invention, to overcome this limitation, the geodesic active contour flow is integrated with a 2-D boundary field, namely the GVF (Gradient Vector Flow). This field refers to a structure similar to the optical flow which points to the direction to be followed to reach the cardiac boundaries. As demonstrated below, the resulting flow of the boundary-driven segmentation module 12 of the invention guarantees the regularity of the evolving interface and can reach the cardiac boundaries from either side.

The region/intensity segmentation module 13 generates global/regional information to render more robust the performance of boundary-driven segmentation process 12. Preferably, a region term (such as the one described in the reference by Paragios, et al., "Geodesic Active Regions for Supervised Texture Segmentation," *IEEE International Conference in Computer Vision,* Corfu, Greece, pp. 926–932, which is incorporated herein by reference) is employed for providing a segmentation map that best groups the image characteristics using some a priori knowledge. Preferably, such characteristics are determined according to the observed image density function (histogram) and an expectation minimization (EM) algorithm. The minimization of this region component leads to a geometric flow, which can deal with noisy/corrupted data and which is free from the initial conditions.

Furthermore, because of the misleading visual information that is provided by the virtue of the nature of the application (e.g., papillary muscles), the system 10 further comprises an anatomical module 15 that implements a coupling function to constrain the relative positions of the endocardium and the epicardium interfaces. The implementation of this constraint leads to a bi-directional flow that propagates the cardiac contours in the normal direction, wherein the propagation preserves their distance within some given limits.

Each of the system components 12, 13 and 15, tends to propagate some contours by creating forces based on the respective underlying model component. In other words, for each relevant pixel in the input cardiac image, each model (boundary, region, anatomical) will associate a preference measurement as determined by the model, which will be used to drive the propagation in the normal direction towards the optimal solution.

The system comprises an integration module 14 which integrates the data-driven (visual information) and anatomical constraints, and leads to a final geometric flow for the segmentation of the left ventricle. More specifically, in a preferred embodiment, the resulting geometric flow solution is obtained by integrating the models (boundary, region, anatomical) on a common platform where the solution comprises a weighted combination of these models.

The resulting solution comprises two contours, one for the inner (endocardium) and one for the outer contour (epicardium). An image rendering unit 16 is provided for rendering the estimated contours on the image data 11.

Boundary Component

The following is a detailed discussion of the boundary-driven module 12 and underlying model, according to preferred embodiments of the invention.

The boundary-driven segmentation module 12 preferably implements a model that is an extension of the geodesic active contour model. The geodesic active contour model assumes the existence of some boundary information. According to this model, the optimal segmentation map for the considered application is determined by two interfaces (one for endocardium and one for the epicardium) that minimize the following objective function:

$$E(\partial R_I, \partial R_O) = \underbrace{\int_0^1 g(|\nabla I(\partial R_I(c_I))|)|\partial R_I(c_I)|dc_I}_{Endocardium} + \underbrace{\int_0^1 g(|\nabla I(\partial R_O(c_O))|)|\partial \dot R(c_O)|dc_O}_{Epicardium} \quad (1)$$

where $\partial R_I(c), \partial R_O(c)$ are planar parameterizations of the endocardium and the epicardium boundaries, respectively, and g( ) is a positive monotonically decreasing function (e.g. Gaussian).

Using the calculus of variations and a gradient descent method for the minimization of the above function, the following motion equations (position u) can be obtained for propagation of the endocardium and the epicardium towards the best solution:

$$\begin{cases} \frac{d}{dt}\partial R_I(u) = (g(|\nabla I(u)|)K_I(u) - \nabla_g(|\nabla I(u)|) \cdot N_I(u))N_I(u) \\ \frac{d}{dt}\partial R_O(u) = (g(|\nabla I(u)|)K_O(u) - \nabla_g(|\nabla I(u)|) \cdot N_0(u))N_O(u) \end{cases} \quad (2)$$

where K is the curvature and $N_I$ and $N_O$ are the inward normals of the evolving inner and outer interfaces, respectively.

The obtained motion equations (2) have a simple interpretation. They shrink an (two) initial contour(s) toward(s) the cardiac boundaries constrained by the curvature effect. This flow can be implemented using level set representations. The resulting flows can adapt to changes of topology without requiring the initial conditions to be in the neighborhood of the optimal solution (they can be far away as far as they satisfy some specific constraints). These constraints are imposed by the nature of the geodesic active contour flow. The data-driven terms tend to shrink (or to expand if the initial conditions are reversed) the interface towards the cardiac boundaries. Thus, the initial contour has to be either completely interior to the area that has to be recovered or it has to surround this area. This requirement decreases the usability of the conventional geodesic active contour model.

It is to be appreciated that in accordance with an embodiment of the invention, this limitation of the conventional geodesic active contour model is addressed by the use of the GVF (Gradient Vector Flow). GVF is discussed in detail in U.S. Patent Application Ser. No. 60/292,445, entitled: "Gradient Vector Flow Fast Geodesic Active Contour", which is filed on even date herewith, and which is commonly assigned and incorporated herein by reference. Briefly, the GVF refers to the definition of a 2-D field that can be used to capture the cardiac boundaries from either sides and can deal with concave regions. To introduce this flow, a continuous edge-based information space is first defined. Preferably, a Gaussian edge detector (zero mean, with $\sigma_E$ variance) is implemented based on the following gradient image:

$$g(p) = \frac{1}{2\pi\sqrt{\sigma_E}} e^{-\frac{|\nabla(G_\sigma * I)(p)|^2}{2\sigma_E^2}}, f(p) = 1 - g(p) \quad (3)$$

where $[G_\sigma * I]$ denotes the convolution of the input with a Gaussian Kernel (smoothing).

The GVF refers to a two dimensional boundary-driven field $[v(p)=(a(p),b(p)), p=(x,y)]$ that is recovered by minimizing the following objective function:

$$E(v) = \int\int \mu(a_x^2 + a_y^2 + b_x^2 + b_y^2) + |\nabla f|^2 |v - \nabla f|^2 dx dy \quad (4)$$

where μ is a blending parameter. One can try to interpret this function: in the absence of boundary information [$|\nabla f|\approx 0$],
the energy is dominated by the partial derivatives of the field, leading to diffusion of the field and a smooth map. On the other hand, when variations on the boundary space [$|\nabla f|$ is large] are observed, the term that dominates the energy is the second one, leading to v=∇f. A detailed interpretation of this energy can be found in Xu, et al., "Gradient Vector Flow: A new External Force for Snakes", *IEEE Conference on Computer Vision and Pattern Recognition,* Puerto Rico, USA, pp. 66–71.

One limitation of the original GVF objective function is that the boundary information is not used directly (the boundary gradient affects the flow). As a consequence, strong as well as weak edges may contribute similarly to the field (under the assumption that their gradients are comparable) due to the diffusion of the boundary information. Advantageously, in accordance with the present invention, to address this limitation, the objective function (4) is modified as follows:

$$E(v) = \int\int \mu(a_x^2 + a_y^2 + b_x^2 + b_y^2) + f|\nabla f|^2 |v - \nabla f|^2 dx dy \quad (5)$$

This modification can lead to diffusion equations that can overcome weak (noisy) edges, as well as guarantee a fair diffusion of the boundary information where strong edges could compensate the flows produced by weak edges.

The minimization of the objective function (5) can be done using the calculus of variations leading to the following diffusion equation:

$$\frac{dv}{dt}(p) = m\nabla^2 v(p) - f(p)(v(p) - \nabla f(x,y))|\nabla f(p)|^2 \quad (6)$$

Equation (6) is preferably used for estimating the gradient vector flow. According to this partial differential equation (PDE) (6), this field will be defined/estimated first in image locations with important boundary information and will be propagated progressively to areas far away from the boundaries. Upon convergence of the flow, this field will contain information regarding the direction to be followed to optimally reach the cardiac boundaries. Then, one can normalize the GVF field $$\left[\hat{v}(p) = \frac{v(p)}{|v(p)|}\right].$$

Figure 3C:
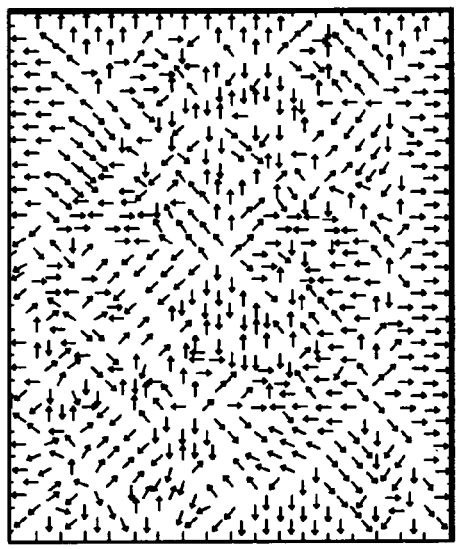
FIG. 3c is an exemplary diagram illustrating a gradient vector flow representation of the image.
Figure 3B:
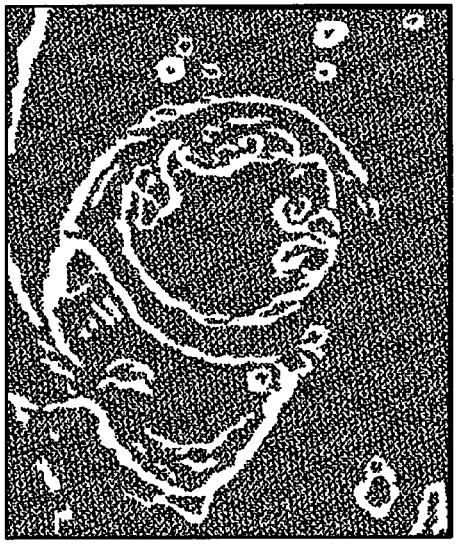
FIG. 3b is an exemplary diagram illustrating detected edges (as detected by an edge detector) in the image.
Figure 3A:
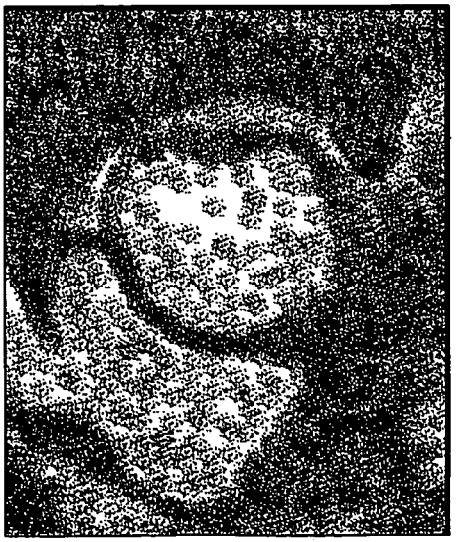

The resulting 2D flow is analogous to the optical flow and can be used to define a new boundary-driven external force. The information provided by this component is mainly contextual and always points to the cardiac boundaries from either sides. The GVF is depicted in FIG. 3. In particular, FIG. 3a illustrates an exemplary input image, FIG. 3b illustrates the corresponding boundary information as detected by an edge detector, and FIG. 3c illustrates the corresponding gradient vector flow.

The underlying field of the snake-based bi-directional geometric flow is proposed in the above-referenced Xu, et al., "*Gradient Vector Flow: A new External Force for*

Snakes". Their approach presents numerous advantages compared with the original snake model while at the same time they share an important limitation: the Lagrangian implementation. However, this is not an important constraint given the application context. Indeed, according to the invention, the left ventricle segmentation problem refers to the recovery of convex single-seed areas (epicardium, endocardium) and, therefore, the handling of topological changes is (which is a limitation of the Lagrangian approach) is not required.

It is to be appreciated that a segmentation method according to the present invention advantageously enables the topology of the evolving interface to be changed. Preferably, the use of multiple seeds leads to better initial estimates for the global/region intensity characteristics of the endocardium and the epicardium. Consequently, accurate segmentation results are achieved.

Furthermore, as explained in further detail below, the anatomical constraint is preferably based on the distance between the endocardium and the epicardium interfaces and the use of level set representations is a preferred method to estimate this distance. In addition, geometric properties of the cardiac contours can be naturally estimated from such level set representations.

Recall that the normalized GVF refers to the direction to be followed to reach the object boundaries. Thus, given the latest positions of the evolving interfaces, the optimal trajectory to reach the cardiac boundaries (from contextual point of view) is to move along the direction of the GVF.

Based on the above, a segmentation method according to an embodiment of the invention determines a (geodesic active contour-based) contextual propagation for the endocardium and the epicardium according to the normalized GVF, wherein the propagation takes place in the normal direction and wherein the propagation is based on the inner product between the interfaces normal and the GVF vector at the given positions [u]:

$$\begin{cases} \frac{d}{dt}\partial R_I(u) = (\hat{v}(u) \cdot N_I(u))N_I(u) \\ \frac{d}{dt}\partial R_O(u) = (\hat{v}(u) \cdot N_O(u))N_O(u) \end{cases} \quad (7)$$

The motion equations (7) move the contours of the inner and outer bounds (i.e., endocardium, epicardium) of the left ventricle in a direction that points to the contour boundary. The motion equations moves a contour in one of two directions based on the location of the boundary. More specifically, the motion equations (7) are interpreted as follows. The evolving interfaces expand maximally when the GVF points outwards and the normal vector has the same or opposite direction. In contrast, the cardiac contours contract maximally when the GVF points inwards and the unit normal has the same or opposite direction. Further, interface positions are not updated when the GVF is tangent to the normal.

The motion equations (7) do not account for visual information. The normalization of the GVF leads to contextual boundary-driven information. Pixels with high gradient and strong edges refer to similar entities with the ones where this information is not present. Following the example of the geodesic active contour flow, we can introduce the image-driven boundary information as follows:

$$\begin{cases} \frac{d}{dt}\partial R_I(u) = g(u)(\hat{v}(u) \cdot N_I(u))N_I(u) \\ \frac{d}{dt}\partial R_O(u) = g(u)(\hat{v}(u) \cdot N_O(u))N_O(u) \end{cases} \quad (8)$$

In the absence of boundary information, the designed flow reflects to a contextual propagation that can lead to the cardiac boundaries from either sides. On the other hand, the presence of image-driven boundary information downgrades the GVF contribution since the assumption that the cardiac boundaries have been recovered is partially satisfied (strong edges).

Internal constraints is a crucial component of the snake model and other boundary-driven segmentation flows. These constraints can guarantee the regularity of the evolving interfaces and the stability of the numerical methods that are used to implement the corresponding flows.

The GVF-based boundary segmentation flow according to the present invention does not account for such type of constraints. Indeed, the human heart is a physical entity that comprises a smooth structure over time and space. Unless abnormal conditions are observed, this a priori knowledge is preferably projected into a low-level segmentation module that is similar to the one produced by the internal constraints. Following the example of the geodesic active contour, a curvature component is preferably used to impose the internal constraints and to convert the a priori abstract knowledge into a low-level segmentation module (the use of cardiac shape prior models constraints could be a more appropriate way to introduce this knowledge). In the following equation, a constraint is imposed based on the assumption that the contours are smooth:

$$\begin{cases} \frac{d}{dt}\partial R_I(u) = g(u)[(1-\alpha)K_I(u) + \alpha(\hat{v}(u) \cdot N_I(u))]N_I(u) \\ \frac{d}{dt}\partial R_O(u) = g(u)[(1-\alpha)K_O(u) + \alpha(\hat{v}(u) \cdot N_O(u))]N_O(u) \end{cases} \quad (9)$$

where α is a blending constant. The term $(1-\alpha)K_I(u)$ imposes a constraint that the contours are smooth and the term $\alpha(\hat{v}(u) \cdot N_I(u))$ denotes the movement of the contour towards the contour boundary.

In summary, by integrating the geodesic active contour and the Gradient Vector Flow, a boundary-driven cardiac segmentation method according to an embodiment of the invention can advantageously deal with arbitrary initial conditions and can handle topological changes.

Statistical Region Component

The following is a detailed discussion of the region/intensity module 13 and underlying model, according to preferred embodiments of the invention. In general, a region/intensity-based segmentation method preferably relies on the homogeneity of spatially localized features and properties. In accordance with the present invention, the Left Ventricle segmentation problem satisfies this criterion. The central idea behind the region/intensity module 13 is to use the evolving interface to define an image partition that is optimal with respect to some grouping criterion. In medical imaging, the observed intensities depend on the properties of the corresponding tissue being mapped.

Furthermore, for the MR sequences of the left Ventricle, the existence of three populations is assumed: (i) the blood (bright), (ii) the muscles (gray) and (iii) the air-filled lungs (dark gray). The characteristics of these populations are spatially and temporally varying, but their intensity properties can be discriminated fairly well. Therefore, the observed distribution (histogram) of the epicardium region can be considered to be a mixture model with three components (assumed to be Gaussians). Let $p_I$ denote the endocardium density function, $p_O$ denote the myocardium density function and $p_B$ denote the density function of the rest of the cardiac organs (background). Then, we define:

$$p(I) = P_I p_I(I) + P_O p_O(I) + P_B p_B(I) \quad (10)$$

where $P_I$, $P_O$, and $P_B$ are a priori probabilities for the endocardium, the myocardium and the background hypotheses. The unknown parameters of the underlying model can be estimated using the expectation-maximization principle.

FIG. 4 is an exemplary diagram illustrating statistical modeling of the visual information (histogram) according to the three hypothesis. Given a cardiac image, a desired area of the image is processed by computing a histogram of the area to obtain the densities. In one embodiment, we assume that the endocardium is bright, the muscle is gray and the background is dark (as shown in FIG. 4a). In the exemplary histogram of FIG. 4b, the curve C1 is the overall data observed in the image, the curve C4 represents the hypothesis for the endocardium, the curve C3 represents the hypothesis for the myocardium, and the curve C2 represents the hypothesis for the background.

The probability density functions are the basis of the region-based partition module 13. The maximization of the a posteriori segmentation probability can be considered as an optimization criterion:

$$E(\partial R_I, \partial R_0) = \underbrace{\int\int_{R_I} r(p_I(I(x,y)))dxdy}_{\text{Epicardium}} + \quad (11)$$

$$\underbrace{\int\int_{R_0 - R_I} r(p_0(I(x,y)))dxdy}_{\text{Myocardium}} +$$

$$\underbrace{\int\int_{I - R_0} r(p_B(I(x,y)))dxdy}_{\text{Background}}$$

where r( ) is a positive monotonically decreasing function such as Gaussian. The model defined in equation (11) is used to separate the different components. The interpretation of the defined model is apparent to one of ordinary skill in the art. The visual information has to maximally support the segmentation map. Thus, a given pixel associated with some visual information contributes to the lowest potential of the objective function if and only if it is assigned to the most probable label according to the probability laws of the different hypotheses $[p_I, p_O, p_B]$. This assignment will load the objective function minimally.

Using the Stokes theorem, the calculus of variations and a gradient descent method, the following motion equations can be obtained (which minimize the energy function (11):

$$\begin{cases} \frac{d}{dt}\partial R_I(u) = [r(p_I(I(u))) - r(p_0(u))]N_I(u) \\ \frac{d}{dt}\partial R_0(u) = [r(p_0(I(u))) - r(p_B(u))]N_0(u) \end{cases} \quad (12)$$

The flow (equation 12) shrinks or expands the evolving interfaces (in the normal direction) towards the segmentation map and better accounts for the expected intensity properties of the epicardium and the myocardium. Moreover, it can be considered as an adaptive balloon force that deflates or inflates the evolving interfaces according to the observed image characteristics.

The benefit of implementing the region/intensity module 13 is evident: the proposed approach will be less dependent on the initial conditions since the region-based flow is acting as a data-driven adaptive balloon force. However, due to the misleading visual information (due to the nature of the application, an intensity-based separation between the epicardium and the background cannot be easily done), sub optimal results may be achieved.

In accordance with the invention, the results of the region-driven flow (module 13, FIG. 2) is integrated (via module 14, FIG. 2) with the boundary GVF-based segmentation module (12, in FIG. 2) leading to the following motion equations:

$$\begin{cases} \frac{d}{dt}\partial R_I(u) = \begin{bmatrix} \underbrace{\beta[r(p_I(I(u))) - r(p_0(u))]}_{\text{region homogenuity}} + \\ \underbrace{\varepsilon g(u)[(1-a)K_I(u) + a(\hat{v}(u) \cdot N_I(u))]}_{\text{regularity \&boundary attraction}} \end{bmatrix} N_I(u) \\ \frac{d}{dt}\partial R_0(u) = \begin{matrix} (\beta[r(p_0(I(u))) - r(p_B(u))] + \\ \varepsilon g(u)[(1-a)K_0(u) + a(\hat{v}(u) \cdot N_0(u)))]N_0(u) \end{matrix} \end{cases} \quad (13)$$

where $\beta$ and $\epsilon$ are blending parameters.

These equations comprise three terms. The first term is a grouping component that is estimated according to the global intensity properties of the area to be recovered. This term accounts for the homogeneity of the myocardium. The second term is an internal component that preserves the regularity of the evolving interfaces. The last term is a boundary attraction component that propagates the cardiac contours towards the myocardium boundaries from either side.

Anatomical Component

The following is a detailed discussion of the anatomical model 15 of FIG. 2, according to preferred embodiments of the invention.

Due to the properties of the cardiac tissue, the visual information can provide misleading segmentation results. Segmentation methods that are based purely on image/data-driven techniques do not take advantage of a priori knowledge (e.g., physiology of the heart) regarding the medical structures of interest. In accordance with another aspect of the invention, a priori knowledge of the anatomy is preferably used as a component of the segmentation process.

In one embodiment, an anatomy-driven low level segmentation process is employed to constrain the relative positions of the epicardium and the endocardium. Indeed, the evolving interfaces refer to cardiac components that are part of a physical entity, the heart structure. It is assumed that their positions, as well as their evolution over time and space, are continuous and in accordance with the motion of the heart.

In accordance with an embodiment of the invention, an anatomical model assumes that the distance between epicardium and endocardium is spatially (slices) and temporally (instances of the cardiac cycle) varying. By determining the evolution of this distance in time and space, the module couples the evolving interfaces according to their shortest (geodesic) path. To facilitate the introduction of this constraint, the temporal evolution of the endocardium-epicardium distance will be ignored.

Consider a pixel (x,y) from the endocardium or the epicardium contour. If $d(\partial R_I, \partial R_O)$ is the minimum Euclidean distance between (x,y) and the evolving interfaces, then:

$$-((x,y) \epsilon \partial R_I) \rightarrow d(\partial R_I(x,y), \partial R_O) = d((x,y), \partial R_O), \quad (14)$$

$$-((x,y) \epsilon \partial R_O) \rightarrow d(\partial R_I, \partial R_O(x,y)) = d((x,y), \partial R_I). \quad (15)$$

In the reference Zeng, et al. "Volumetric Layer Segmentation Using Coupled Surfaces Propagation", *IEEE Conference on Computer Vision and Pattern Recognition*, Santa Barbara, USA, pp. 708–715) a passive coupling term was proposed for cortex segmentation that has led to outstanding results. The central idea behind this approach was to introduce a coupling function that tends to halt the propagation of the cortex contours when their distance goes beyond the acceptable limits. However, this is a hard constraint and does not evolve the cardiac contours and presents a passive behavior.

In accordance with a preferred embodiment of the invention, an active coupling module is employed which satisfies the following conditions for the endocardium (inner contour):

(i) if the distance from the epicardium for the given pixel is within the acceptable limits $[m \leq d(\partial R_I(u), \partial R_O \leq M]$, then the constraint is satisfied and no action is to be taken;

(ii) if this distance is below the minimum acceptable value $[d(\partial R_I(u), \partial R_O) < m]$, then the endocardium is very close to the epicardium and the endocardium has to shrink to preserve the distance constraint; and (iii) if this distance is beyond the maximum acceptable value $[d(\partial R_I(u), \partial R_O) > M]$, then the endocardium is far away from the epicardium and the endocardium has to expand in order to satisfy the distance constraint.

Based on this formulation, a coupling function for the endocardium interface according to an embodiment of the invention is preferably defined as follows:

$$C_I(d(x, y)) = \begin{cases} 1, & [d(x, y) < m] \\ -1, & [d(x, y) > M] \\ 0, & m \leq d(x, y) \leq M \end{cases} \quad (16)$$

Similar conditions can be obtained using the same reasoning for the endocardium (outer contour):

(i) if $[m \leq d(\partial R_I, \partial R_O(u)) \leq M]$, then the constraint is satisfied and no action is taken;

(ii) if $[d(\partial R_I, \partial R_O(u)) < m]$, then the epicardium is very close to the endocardium and the epicardium has to expand to preserve the constraint; and (iii) if $[d(\partial R_I, \partial R_O(u)) > M]$, then the epicardium is far away from the endocardium and the epicardium has to shrink in order to satisfy the constraint.

Based on these conditions, a coupling function according to another embodiment of the invention is defined for the epicardium interface (outer contour) as follows:

$$C_0(d(x, y)) = \begin{cases} -1, & [d(x, y) < m] \\ 1, & [d(x, y) > M] \\ 0, & m \leq d(x, y) \leq M \end{cases} \quad (17)$$

The coupling functions (16) and (17) are preferably implemented (in the analytical module 15 of FIG. 2) to provide an active anatomical model that preserves the distance between the cardiac contours within some acceptable limits. The model provides an active propagation force that locally evolves the cardiac contours in the normal direction towards positions that satisfy a set of distance requirements according to the invention as follows:

$$\begin{cases} \frac{d}{dt} \partial R_I(u) = C_I(d(\partial R_I(u), \partial R_0)) N_I(u) \\ \frac{d}{dt} \partial R_0(u) = C_0(d(\partial R_I, \partial R_0(u))) N_0(u) \end{cases} \quad (18)$$

The coupling function (18) affords many advantages. For example, the coupling function can have either a strong or a soft contribution to the segmentation algorithm as desired. In addition, the coupling function has an active role in the sense that it recovers a topology for the evolving interfaces that satisfies the constraints. This is to be contrasted with conventional methods (Zeng, et al.) that define a hard constraint that reduces the set of acceptable topologies/solutions.

The Complete Model

It is to be appreciated that the present invention combines a data-driven (visual information) flow with anatomical constraints to provide a geometric flow for the segmentation of the Left Ventricle. A segmentation model according to the invention is not related to an optimization criterion, but such model takes full advantage of the application framework and maximizes the outcome of the visual information. In accordance with an embodiment of the invention, a complete model for segmentation is preferably defined as follows:

$$\begin{cases} \frac{d}{dt}\partial R_I(u) = \left[\gamma \underbrace{C_I(d(\partial R_I(u), \partial R_0))}_{\text{anatomical constraint}}\right]N_I(u) + \\ \qquad \left[\underbrace{\beta[r(p_I(I(u))) - r(p_0(u))]}_{\text{region homogenuity}}\right] + \\ \qquad \underbrace{\in g(u)[(1-\alpha)K_I(u) + \alpha(\hat{v}(u) \cdot N_I(u))]}_{\text{regularity \& boundary attraction}}N_I(u) \\ \frac{d}{dt}\partial R_0(u) = (\gamma C_0(d(\partial R_I, \partial R_0(u))))N_I(u) + \\ \qquad (\beta[r(p_0(I(u))) - r(p_B(u))] + \\ \qquad \in g(u)[(1-\alpha K_O(u) + \alpha(\hat{v} \cdot N_O(u)))]N_O(u) \end{cases} \quad (19)$$

where (is a blending parameter. These geometric flows comprise four different forces, all acting in the direction of the normal:

(i) a curvature-driven term that accounts for the internal properties of the evolving interfaces;

(ii) a boundary-driven bi-directional force that tends to propagate the cardiac contours towards their real boundaries;

(iii) an intensity-driven region force that accounts for the homogeneity of the cardiac regions; and (iv) An anatomy-driven constraint that relates the positions of the endocardium and the epicardium.

Implementation Issues

A Lagrangian approach is a common technique to implement geometric flows. These techniques adopt to a small set of (control) points to represent the evolving interface (a uniform sampling rule regarding the distance between two consecutive points can be used). Then the positions of the control points are updated according to the motion equations.

Enormous progress has been made during the last decade regarding numerical methods for the implementation of such techniques. Therefore, they are the basis for many snake-based medical image segmentation techniques with excellent performance. However, such techniques are limited in various respects.

For instance, changing the topology of the evolving interface is a major limitation of Lagrangian techniques. Some methods have been proposed to overcome this limitation, providing good performance for flows that refer to curves and surfaces, but such methods cannot be generalized to higher dimensions. Another limitation is the estimation the geometric properties such as the normal and the curvature of the evolving interface. The re-parameterization of the evolving structure is often required. This re-parameterization is done according to a sampling rule. Therefore, the estimates of the interface properties strongly depend on this rule.

Level Set Representations are alternatives to Lagrangian approaches (see, e.g., Osher, et al., "Fronts Propagating With Curvature-Dependent Speed: Algorithms based on the Hamilton-Jacobi Formulation," Journal of Computational Physics 79, 12–29, which is incorporated herein by reference). The central idea behind this methodology is to represent the evolving interfaces $\partial R_I(u;t)$, $\partial R_O(u;t)$ as the zero-level sets of higher-dimensional functions $[\phi_I,\phi_O]$ as follows:

$$\begin{cases} \phi(\partial R_I(u, t), t) = 0 \\ \phi(\partial R_0(u, t), t) = 0 \end{cases} \quad (20)$$

Such representations for $[\partial R_I(u),\partial R_O(u)]$ are implicit, parameter-free and intrinsic. Moreover, they are topology-free, since different topologies of the zero level-set do not imply different topologies of $[\phi_I,\phi_O]$.

Let us a consider the simplest form of a geometric flow:

$$\frac{\partial}{\partial t}\partial R_x(u, t) = F_x(K_{\partial R_x}(u, t))N(u, t) \quad (21)$$

This flow evolves an initial contour in the normal direction according to some scalar function F that may depend on the interface geometric properties (i.e., curvature). The basic derivation of the (embedding) function φ leads to the following level set flow:

$$\frac{d}{dt}\phi_x(u, t) = F_x(K_{\partial R_x}(u, t))|\nabla \phi_x(u, t)| \quad (22)$$

where $$N = \frac{\nabla \phi}{|\nabla \phi|}.$$

The solution of this level-set flow is independent from the choice of the embedding function φ. The singed Euclidean distance from the evolving interface is a common selection for φ.

Preferably, the Level Set Representations are used for the implementation of the cardiac segmentation flows. The only issue to be dealt with refers to a mechanism for the continuous estimation of the distance between the evolving interfaces of the epicardium and the endocardium. This issue can be addressed by considering the signed Euclidean distance as embedding function. This selection reflects the shortest path between the evolving interfaces. According to an embodiment of the invention, the projection of the cardiac segmentation flows to the Level Set space is preferably done as follows:

$$\begin{cases} \frac{d}{dt}\phi_I(u) = [\gamma C_I(\phi_O(u))]\frac{\nabla \phi_I(u)}{|\nabla \phi_I(u)|} + \\ \quad [\beta[r(p_I(I(u))) - r(p_O(u))] + \\ \quad \varepsilon g(u)\left[(1-\alpha)K_I(u) + \alpha\left(\hat{v}(u) \cdot \frac{\nabla \phi_I(u)}{|\nabla \phi_I(u)|}\right)\right]\right]\frac{\nabla \phi_I(u)}{|\nabla \phi_I(u)|} \\ \frac{d}{dt}\phi_O(u) = [\gamma C_O(\phi_I(u))]\frac{\nabla \phi_O(u)}{|\nabla \phi_O(u)|} + \\ \quad [\beta[r(p_O(I(u))) - r(p_B(u))] + \\ \quad \varepsilon g(u)\left[(1-\alpha)K_O(u) + \alpha\left(\hat{v}(u) \cdot \frac{\nabla \phi_O(u)}{|\nabla \phi_O(u)|}\right)\right]\right]\frac{\nabla \phi_O(u)}{|\nabla \phi_O(u)|} \end{cases} \quad (23)$$

However, the definition of the coupling term refers to a discontinuous function that may cause instability problems during the numerical implementation of the defined flows. To deal with this issue, we consider a smooth function with the same properties as the ones of the original one:

$$C_\delta(\phi) = \begin{cases} 1, & \text{if } [x \le m] \cup [\phi > M] \\ 0, & \text{if } [m + \delta < x < M - \delta] \\ \left(\frac{\phi - m}{\delta}\right)^2, & \text{if } [m < \phi \le m + \delta] \\ \left(\frac{x - M + \delta}{\delta}\right)^2, & \text{if } [M - \delta \le \phi \le M] \end{cases} \quad (24)$$

It is to be noted that the final model comprises several parameters ($\alpha,\beta,\epsilon,\gamma,\delta,m,M$). Certainly, the use of different information-driven segmentation modules may increase the performance of the resulting algorithm. However, their proper integration may be an issue and this is the case also for our approach.

Based on experiments, it has been determined that the regional/intensity information is the most reliable visual source ($\beta$=0.5). The boundary component also has a stable behavior (it accounts for the discontinuities of the intensity information) ($\epsilon$=0.2). Further, the regularity of the evolving interface has to be enforced ($\alpha$=0.25). The anatomical module is a soft to hard constraint ($\gamma$=0.3). The distance limits are defined according to the spatial position of the considered slice. The middle cardiac slices correspond to the maximum volume for the left ventricle and therefore the limits are as wide as possible (m=4, M=8, $\delta$=2).

Currently, we are in the process of developing an automatic method to determine the anatomical module parameters. The myocardium can be extracted properly in most of the parts of the Left Ventricle. Therefore, the papillary muscles and the structures with similar visual properties with the myocardium can be considered as outliers with respect to the distance between the evolving cardiac contours. Methods based on robust statistics can be used to recover the mean and the variability of this distance, leading to an auto-determination of the anatomical constraint spatially and temporally.

Numerical Implementation

A fast and robust numerical approach for the implementation of the proposed framework is preferably based on the known Additive Operator Splitting (AOS) schema as described, for example, in Weickert, et. al., "Efficient and Reliable Scheme For Non-Linear Diffusion and Filtering," *IEEE Transactions on Image Processing*, 7, 398–410, 1998, which is incorporated herein by reference. This technique has been successfully applied to the evolution of planar curves using level set methods in Goldenberg, et al., "Fast Geodesic Active Contours"., *International Conference on Scale-Space Theories In Computer Vision*, pp. 34–35 (1999).

One of the limitations with using PDEs (partial differential equations) in computer vision is poor efficiency. Classic numerical approximations are unstable which results in time consuming methods. This is due to the need of a small time step that guarantees a stable evolution and convergence to the PDEs. One method for overcoming this limitation is introduced in the above-incorporated Weickert, et al. and is efficiently used to provide a stable numerical method to a wide variety of PDEs.

For purposes of illustration, consider the one dimension case by considering a diffusion equation of the following form:

$$\partial_t u = \text{div}(g(|\nabla u|)\nabla u) \quad (25)$$

Then, this diffusion equation can be discretized as follows:

$$\partial_t u = \partial_x(g(|\partial_x u|)\partial_x u) \quad (26)$$

that leads to the following iterative scheme:

$$u^{m+1} = [I + \tau A(u^m)]u^m \quad (27)$$

where I is the identity matrix and $\theta$ is the time step. Although this system updates explicitly the u values using their values from the previous iteration, it is not stable while the time step is constrained by an upper bound. One can consider the use of a semi-implicit scheme:

$$u^m = [I - \tau A(u^m)]u^{m+1} \quad (28)$$

that has a stable behavior but is computationally expensive. The AOS technique refers to the following modification of the semi-implicit schema:

$$u^{m+1} = [I - \tau A(u^m)]^{-1} u^m \quad (29)$$

The Additive Operator Splitting has some advantageous properties in that it (i) is stable; (ii) satisfies all the criteria for discrete non-linear diffusion; (iii) has low complexity (linear to the number of pixels); and (iv) can be easily extended to higher dimensions. Therefore, an AOS scheme is preferably applied with the level set motion equations described herein for the segmentation of the Left Ventricle.

To further decrease the required computational cost of the level set propagations, the AOS scheme can be efficiently combined with the Narrow Method (see, e.g., Adalsteinsson, et al., "A Fast Level Set Method For Propagating Interfaces," *Journal of Computational Physics* 118, 269–277, (1995), which is incorporated herein by reference). The essence of this method is to perform the level set propagation only within a limited band. This band is defined according to the latest position of the propagating contours. Thus, the area of interest is significantly reduced resulting in a significant decrease of the computational complexity. This method requires a frequent re-initialization of the level set representations (distance functions) that can be done efficiently using the Fast Marching algorithm (see, e.g., J. Sethian, "Level Set Methods", Cambridge University Press, 1996, which is incorporated herein by reference). A similar algorithm within the area of automatic control was proposed in the reference by J. Tsitsiklis, "Efficient Algorithms For Globally Optimal Trajectories", *IEEE Transaction on Automatic Control* 40, 1528–1538 (1995).

Conclusions, Experimental Results

In summary, the present invention provides a geometric flow for the segmentation of the left ventricle, in MR cardiac images. Our approach is based on the propagation of two curves (cardiac contours) under the influence of regularity, boundary, region and anatomy-driven forces. This framework makes use of non-parametric curves, and is implemented using level set representations. Several MR cardiac sequences have been used for the validation of our approach that have led to very promising experimental results.

Figure 5:
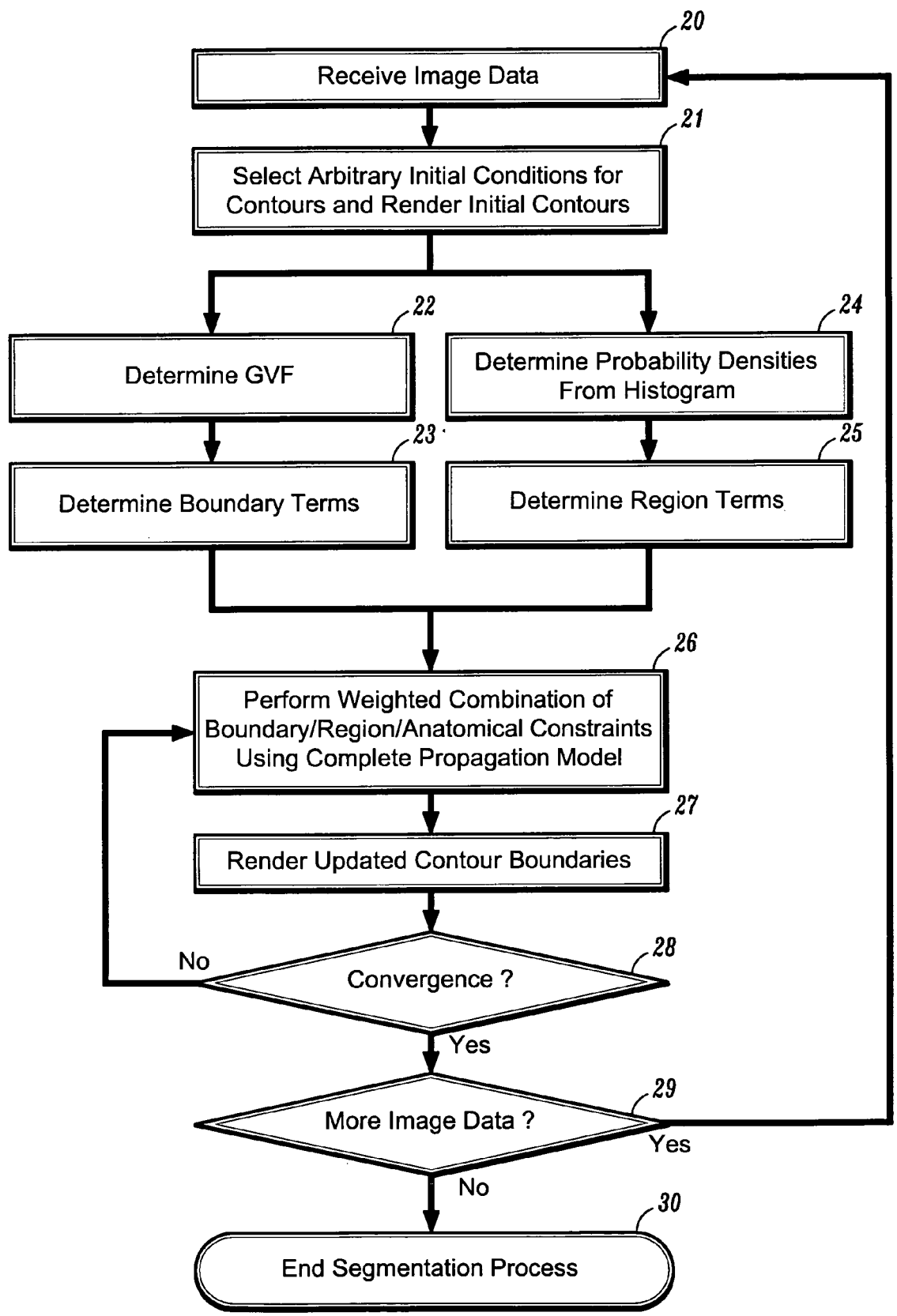
FIG. 5 is a flow diagram of a method for segmenting a cardiac image according to an embodiment of the invention.

FIG. 5 is a flow diagram of a method for segmenting a cardiac image according to an embodiment of the present invention. FIGS. 6(*a*) through 6(*h*) are exemplary diagrams illustrating the propagation of two contours, the endocardium (inner contour) and the epicardium (outer contour) to convergence of the contours on the desired inner and outer boundaries of the myocardium of the left ventricle.

Figure 6A:
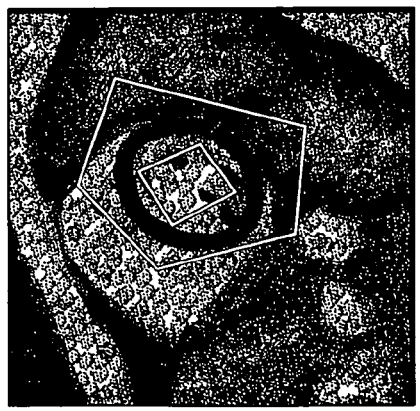
FIGS. 6(a)–6(h) are exemplary diagrams illustrating propagation of two contours to convergence on the endocardium and epicardium boundaries during a segmentation process according to the invention.
Figure 6B:
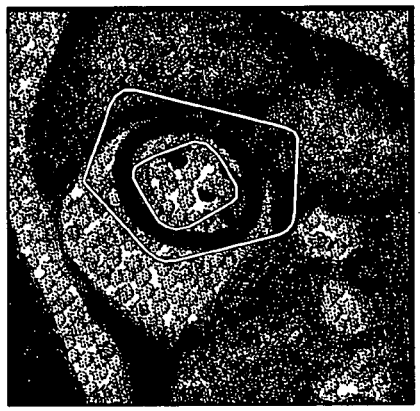
Figure 6C:
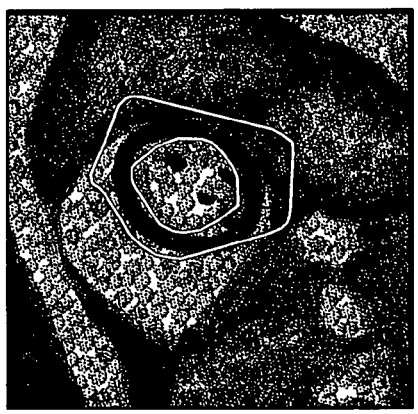
Figure 6D:
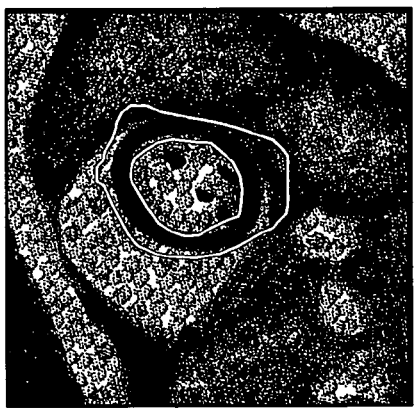
Figure 6E:
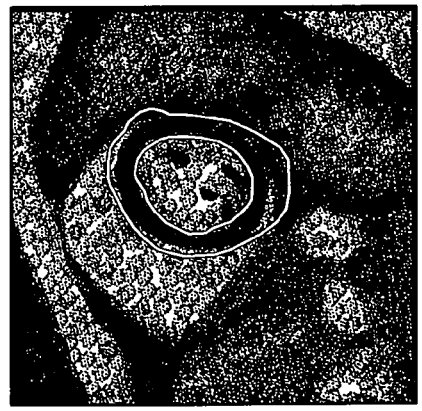
Figure 6F:
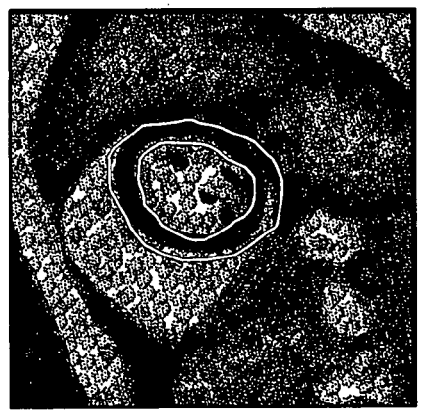
Figure 6G:
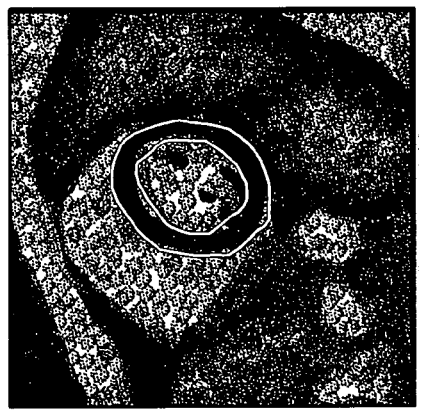
Figure 6H:
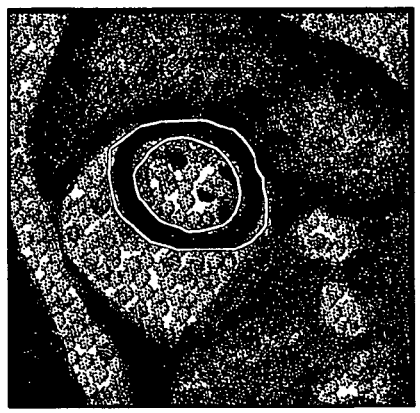

Referring to FIG. 5, a segmentation process according to an embodiment of the invention begins with receiving image data (step 20). The image data comprises several 2-dimensional slices at a give time captured during an MRI acquisition. For instance, each of the FIGS. 6(*a*)–(*h*) depict the same 2-d image captured at a given time and depth in a 3d volume. Initial arbitrary conditions are selected for the initial contours and these initial contours are rendered (step 21). For instance, FIG. 6*a* illustrates the initial (arbitrary) inner and outer contours, which are propagated (via the segmentation process) towards a final solution shown in FIG. 6(*h*). Preferably, the initial inner contour is within the endocardium.

To capture the visual information that is used for segmentation; the gradient vector flow is determined for the image (step 22) using equation (6) for example. The boundary terms are then determined based on the GVF (step 23). As noted above, for each pixel, convergence of the GVF generates a vector that points to the direction (from the pixel) towards the cardiac boundary (see FIG. 3*c*.). At the same time (assuming parallel processing), probability densities are determined using histogram data associated with the image (step 24). As noted above, each probability density is associated with a hypothesis and a region of interest, which allows the pixels of the image to be grouped based on predetermined criteria. The region terms are determined (step 25) via the pixel grouping to delineate structures or regions in the image. For example, as noted above with reference to FIG. 4, the myocardium, endocardium and background regions are separated and contours determined there from.

Next, the boundary and region data (visual information) is processed using an integrated propagation model that applies a coupling function (anatomical constraints) to iteratively determine the actual contour boundaries (step 27). For example, the propagation model of equation (19) is preferably applied to determine the actual boundaries of the inner and outer walls (endocardium and epicardium) of the myocardium of the left ventricle. In other words, starting from the initial arbitrary contours, the contours are propagated in such a manner as to take into account the boundary and region information while satisfying the anatomical constraints applied in the complete propagation model. As the iterative process is performed, the updated position of the contours can be rendered on the image, such as shown in FIGS. 6*a*–*h*. This process (steps 26–27) is repeated until there is convergence of the solution (affirmative result in step 28). The segmentation process (steps 21–28) are repeated for each image slice to be processed. For a 3-D implementation, a 3-D segmentation map can be recovered by applying the 2-D method (FIG. 5) slice-by-slice and then putting the results together.

In summary, various novel features of a geometric flow model and segmentation process according to the present invention comprise:

(i) the use of a novel flexible external boundary term that is free from the initial conditions;

(ii) the integration of boundary-driven and region-based information segmentation modules;

(iii) the use of the application context to define propagation constraints that deal with the physically corrupted and incomplete data;

(iv) the use of the latest developments on numerical techniques associated with PDEs to implement the obtained motion equations robustly and with a high convergence rate.

Extensions of the segmentation algorithm include 3-D segmentation using coupled surfaces propagations. We anticipate that such extension can be easily done in the level set framework. The use of these representations to implement 3-D flows is already a standard technique (state-of-art) in the vision and image processing literature.

In other embodiments of the invention, shape priors can be implemented with the propagation model within a level set energetic framework (see, e.g., Paragios, et. al., "Shape Priors for Level Set Representations", In *European Conference on Computer Vision*, Copenhagen, 2002, Vol. 2, pp. 78–92, which is incorporated herein by reference). Several issues are related with such an objective. First the selection of the shape representation, second the registration of the training samples and third the shape prior term itself.

In addition, image registration is a critical component in medical image analysis. Structures like cortex, heart ventricles, kidney, etc. are of great interest. Registering these structures with respect to some prior models or to their previous state (imagery of the past) is an interesting application with strong diagnostic power. Towards this end, we are willing to couple the registration and the segmentation problem. Segmenting medical structures while the same time registering them to their previous state is a challenging direction to be considered.

Although illustrative embodiments have been described herein with reference to the accompanying drawings, it is to be understood that the present invention is not limited to those precise embodiments, and that various other changes and modifications may be affected therein by one skilled in the art without departing from the scope of the invention

What is claimed is:

1. A method for segmenting a cardiac image, comprising the steps of:

receiving a cardiac image;
determining boundary information for at least two contours in the cardiac image using a gradient vector flow boundary method;
determining region information to separate regions in the cardiac image according to their global intensity parameters; and
applying a propagation model that combines the boundary and region information to propagate the at least two contours to respective target boundaries in the cardiac image while applying an anatomical constraint to couple the propagation of the at least two contours to their respective target boundaries in the cardiac image according to their relative distance between the at least two contours in which said their relative distance can be calculated with time and space.

2. The method of claim 1, further comprising the step of selecting arbitrary initial conditions for the contours.

3. The method of claim 1, wherein the target boundaries comprise the endocardium and epicardium of the left ventricle of the heart.

4. The method of claim 1, wherein a boundary component of the propagation model is based on an extension of the geodesic active contour model using the gradient vector flow.

5. The method of claim 1, wherein the propagation is implemented using level set representations that can deal with topological changes.

6. The method of claim 5, wherein level set propagation is implemented using an Additive Operator Splitting method.

7. The method of claim 1, wherein the propagation model comprises a weighted integration of a boundary segmentation model, a region model and coupling function.

8. The method of claim 1, wherein the step of applying a propagation model comprises applying a constraint to a boundary component of the propagation model, which is based on the physical nature of the target boundaries.

9. The method of claim 8, wherein the constraint of the boundary component comprises a smoothness constraint.

10. The method of claim 1, wherein the step of determining region information comprises applying a data-driven adaptive balloon force to deflate or inflate the evolving contours based on the observed image characteristics.

11. The method of claim 1, wherein the anatomical constraint comprises an active coupling function that preserves a certain topology for the evolving contours.

12. The method of claim 1, further comprising the step of rendering the propagation of the contours on the cardiac image during the segmentation process.

13. A program storage device readable by a machine, tangibly embodying a program of instructions executable by the machine to perform method steps for segmenting a cardiac image, the method steps comprising:
receiving a cardiac image;
determining boundary information for at least two contours in the cardiac image using a gradient vector flow boundary method;
determining region information to separate regions in the cardiac image according to their global intensity parameters; and
applying a propagation model that combines the boundary and region information to propagate the at least two contours to respective target boundaries in the cardiac image while applying an anatomical constraint to couple the propagation of the at least two contours to their respective target boundaries in the cardiac image according to a relative distance between the at least two contours.

14. The program storage device of claim 13, further comprising instructions for performing the step of selecting arbitrary initial conditions for the contours.

15. The program storage device of claim 13, wherein the target boundaries comprise the endocardium and epicardium of the left ventricle of the heart.

16. The program storage device of claim 13, wherein a boundary component of the propagation model is based on an extension of the geodesic active contour model using the gradient vector flow.

17. The program storage device of claim 13, wherein the propagation is implemented using level set representations that can deal with topological changes.

18. The program storage device of claim 17, wherein level set propagation is implemented using an Additive Operator Splitting method.

19. The program storage device of claim 13, wherein the propagation model comprises a weighted integration of a boundary segmentation model, a region model and coupling function.

20. The program storage device of claim 13, wherein the instructions for applying a propagation model comprise instructions for applying a constraint to a boundary component of the propagation model, which is based on the physical nature of the target boundaries.

21. The program storage device of claim 20, wherein the constraint of the boundary component comprises a smoothness constraint.

22. The program storage device of claim 13, wherein the instructions for determining region information comprise instructions for applying a data-driven adaptive balloon force to deflate or inflate the evolving contours based on the observed image characteristics.

23. The program storage device of claim 13, wherein the anatomical constraint comprises an active coupling function that preserves a certain topology for the evolving contours.

24. The program storage device of claim 13, further comprising instructions for rendering the propagation of the contours on the cardiac image during the segmentation process.

* * * * *